United States Patent
Pivowar et al.

(10) Patent No.: US 6,308,201 B1
(45) Date of Patent: Oct. 23, 2001

(54) SYSTEM AND METHOD FOR SHARING DATA AMONG A PLURALITY OF PERSONAL DIGITAL ASSISTANTS

(75) Inventors: Alvin Pivowar; Steve Hanrahan; Pete Grillo, all of Portland, OR (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/289,771

(22) Filed: Apr. 8, 1999

(51) Int. Cl.$^7$ .................................................. G06F 15/167
(52) U.S. Cl. ...................... 709/214; 709/213; 709/216; 707/201
(58) Field of Search .................................. 709/213, 214, 709/216; 707/201

(56) References Cited

U.S. PATENT DOCUMENTS

| | | | |
|---|---|---|---|
| 4,831,552 | 5/1989 | Scully | 364/518 |
| 5,129,057 | 7/1992 | Strope | 395/161 |
| 5,261,045 | 11/1993 | Scully | 395/161 |
| 5,457,476 | 10/1995 | Jensen | 345/146 |
| 5,479,411 | 12/1995 | Klein | 370/110.1 |
| 5,528,745 | 6/1996 | King | 395/161 |
| 5,557,659 | 9/1996 | Hyde-Thompson | 379/88 |
| 5,621,458 | 4/1997 | Mann | 348/232 |
| 5,647,002 | 7/1997 | Brunson | 380/49 |
| 5,684,990 | 11/1997 | Boothby . | |
| 5,862,346 | 1/1999 | Kley | 395/200.73 |
| 5,870,759 * | 2/1999 | Bauer et al. | 707/201 |
| 5,877,759 | 3/1999 | Bauer | 345/339 |
| 5,907,678 * | 5/1999 | Housel, III et al. | 709/213 |
| 5,949,975 * | 9/1999 | Batty et al. | 709/213 |
| 5,996,714 | 10/1999 | Huang | 707/210 |
| 6,000,000 * | 12/1999 | Hawkins et al. | 707/201 |
| 6,023,708 | 2/2000 | Mendez | 707/203 |
| 6,034,621 | 3/2000 | Kaufman | 340/825.44 |
| 6,034,683 | 3/2000 | Mansour | 345/339 |
| 6,131,096 | 10/2000 | Ng | 707/10 |
| 6,131,116 | 10/2000 | Riggins | 709/219 |
| 6,151,606 | 11/2000 | Mendez | 707/201 |
| 6,161,146 | 12/2000 | Kley | 709/248 |

FOREIGN PATENT DOCUMENTS

WO 99/06900  11/1999  (WO) .

OTHER PUBLICATIONS

Puma Technology, Intellisync, http://www.pumatech.com/intellisync.html, Feb. 22, 1999.
TrueSync Technology, TrueSync Tehcnology Platform, http://www.starfich.com/products/truetech/truetech.html, Feb. 22, 1999.
When.com, What is When.com?, http://www.when.com, Apr. 7, 1999.
PointCast, PointCast Network, http://www.pointcast.com/products/pcn/index.html?homepb, Apr. 7, 1999.
PointCast, PointCast Network, http://www.pointcast.com/products/pcn/hwork.html?pcnidxbody Apr. 7, 1999.

* cited by examiner

*Primary Examiner*—Krisna Lim
(74) *Attorney, Agent, or Firm*—Oppenheimer Wolff & Donnelly LLP

(57) ABSTRACT

A system and method are provided for sharing data among a plurality of users. Included are a plurality of personal digital assistants, or PDA's, each suitable for storing a plurality of personal data sets thereon. Associated therewith is a server including a plurality of server data sets stored thereon. A communication link between the PDA's and the server is adapted for synchronizing the server data sets with the personal data sets in order to obtain the personal data set of one PDA on another PDA, thereby synchronizing the personal data sets between different PDA's. The personal data sets of each of the PDA's have personal identification codes assigned thereto and the server data sets of the server have server identification codes assigned thereto. A map correlating the personal identification codes and the server identification codes is stored on at least one of the PDA's, the server, and a computer in which the communication link is resident for identification purposes during synchronization of the personal data sets and the server data sets.

45 Claims, 18 Drawing Sheets

SYSTEM AND METHOD FOR SHARING DATA AMONG A PLURALITY OF PERSONAL DIGITAL ASSISTANTS

CROSS REFERENCE TO RELATED APPLICATIONS

The present application is related to co-pending applications entitled "System and Method for Synchronizing Multiple Calendars over a Wide Area Network" by Inventors Alvin Pivowar, Steve Hanrahan and Pete Grillo, Ser. No. 09/289,764, filed Apr. 8, 1999, and incorporated herein by reference; "System and Method for Synchronizing Data Among a Plurality of Users Via an Intermittently Accessed Network" by Inventors Alvin Pivowar, Steve Hanrahan and Pete Grillo, Ser. No. 09/289,769, filed Apr. 8, 1999, and incorporated herein by reference; "System and Method for Displaying Multiple Calendars on a Personal Digital Assistant" by Inventors Alvin Pivowar, Steve Hanrahan and Pete Grillo, Ser. No. 09/288,774, filed Apr. 8, 1999, and incorporated herein by reference; and "System and Method for Advertising during a Data Transfer Process" by Inventors Alvin Pivowar, Steve Hanrahan and Pete Grillo, Ser. No. 09/289,273, filed Apr. 8, 1999, and incorporated herein by reference.

FIELD OF THE INVENTION

The present invention relates generally to personal digital assistants and, more particularly, to a system and method for synchronizing data among a plurality of different personal digital assistants over a wide area network.

BACKGROUND OF THE INVENTION

Personal digital assistants, or PDA's, are commonly known hand-held computers that can be used to store various personal information including, but not limited to contact information, calendar information, etc. Such information can be downloaded from other computer systems, or can be inputted by way of a stylus and pressure sensitive screen of the PDA. Examples of PDA's are the Pahm™ computer of 3Com Corporation, and Microsoft CE™ computers which are each available from a variety of vendors.

Users of PDA's commonly do not rely solely on such units for storing important information. For example, full-size desktop computers are also used to store information during the course of other activities such as receiving and responding to electronic mail. This tends to lead to the generation of separate and discrete sets of information on both the PDA and desktop computer. Of course, maintaining multiple sets of information is undesirable due to obvious organization problems.

To overcome this difficulty, information on a desktop computer is often "synchronized" with information on a PDA. In other words, any new information in the form of additions, deletions, and/or changes that exists on either the desktop computer or the PDA is reflected on both. By frequently synchronizing data between the desktop computer and the PDA, a user is ensured to have one set of completely updated information which leads to increased organization.

One issue that is not fully addressed in prior art PDA's is synchronizing data between PDA's of different users. While the PDA of a first user may properly reflect the contact information of a person, i.e. John Doe, a second user may have John Doe's previous, incorrect contact information, thereby reflecting a lack of synchronization. Moreover, many complications can arise due to conflicting scheduled events and meetings. For example, calendar software of the Palm™ PDA only allows a single calendar to be used.

Such lack of organization is primarily caused by the lack of shared information among PDA's of different users. Up to now, focus has been only on promoting organization of a single user by way of synchronization between a PDA, a desktop computer, and a remote server.

There is thus a need for a system and method for synchronizing data between a plurality of different PDA's to promote organization among multiple different users.

DISCLOSURE OF THE INVENTION

A system and method are provided for sharing data among a plurality of users. Included are a plurality of personal digital assistants, or PDA's, each suitable for storing a plurality of personal data sets thereon. Associated therewith is a server including a plurality of server data sets stored thereon. A communication link between the PDA's and the server is adapted for synchronizing the server data sets with the personal data sets in order to obtain the personal data set of one PDA on another PDA, thereby synchronizing the personal data sets between different PDA's.

The personal data sets of each of the PDA's have personal identification codes assigned thereto and the server data sets of the server have server identification codes assigned thereto. A map correlating the personal identification codes and the server identification codes is stored on at least one of the PDA's, the server, and a computer in which the communication link is resident for identification purposes during synchronization of the personal data sets and the server data sets.

In one embodiment, the types of personal data that may be stored on the PDA include contact and calendar information. During synchronization, both the contact information and calendar information may be exchanged between different PDA's. For example, contact information may be updated on multiple different PDA's, calendar information of a plurality of PDA's may be synchronized and conflicts may be addressed, and/or calendar information of a plurality of users may be stored and updated on each PDA.

In another embodiment, the communication link, or conduit, is resident in a client computer and is connected to a server via a network. Specifically, the conduit may be used to interface both a local memory of the client computer and the server. Upon a connection being established between the client computer and the server, synchronization is executed. If, however, it is impossible for such connection to be established, a local copy of the synchronization may be stored on the local memory of the client computer to be synchronized with the server at a later time.

In still yet another embodiment, the synchronization of the personal data of different PDA's only occurs on personal data specifically marked to be shared. By requiring the personal data to be marked as shared, privacy concerns are addressed and the user is granted selectivity with respect to who receives personal data.

In yet another embodiment, conflicts between shared personal data are addressed with various methods. It should be noted that a conflict occurs when particular personal data of a first PDA is synchronized with the server data before similar shared personal data of a second PDA is synchronized with the server data.

In order to deal with such conflicts, the present invention provides a resolution by replicating the particular conflicted personal data as a separate file. In the alternative, the conflict may be resolved by synchronizing the particular personal data of the second PDA with the server data, thereby overriding the personal data of the first PDA. In still yet another embodiment, the conflict may be resolved by not synchronizing the particular personal data of the second PDA with the server data, thereby being overridden by the personal data of the first PDA. Finally, the conflict may be resolved by marking the particular personal data of the second PDA to be altered by a user via a user interface.

These and other advantages of the present invention will become apparent upon reading the following detailed description and studying the various figures of the drawings.

BRIEF DESCRIPTION OF THE DRAWINGS

The foregoing and other objects, aspects, and advantages are better understood from the following detailed description of a preferred embodiment of the invention with reference to the drawings, in which.

DESCRIPTION OF THE PREFERRED EMBODIMENTS

Figure 1:
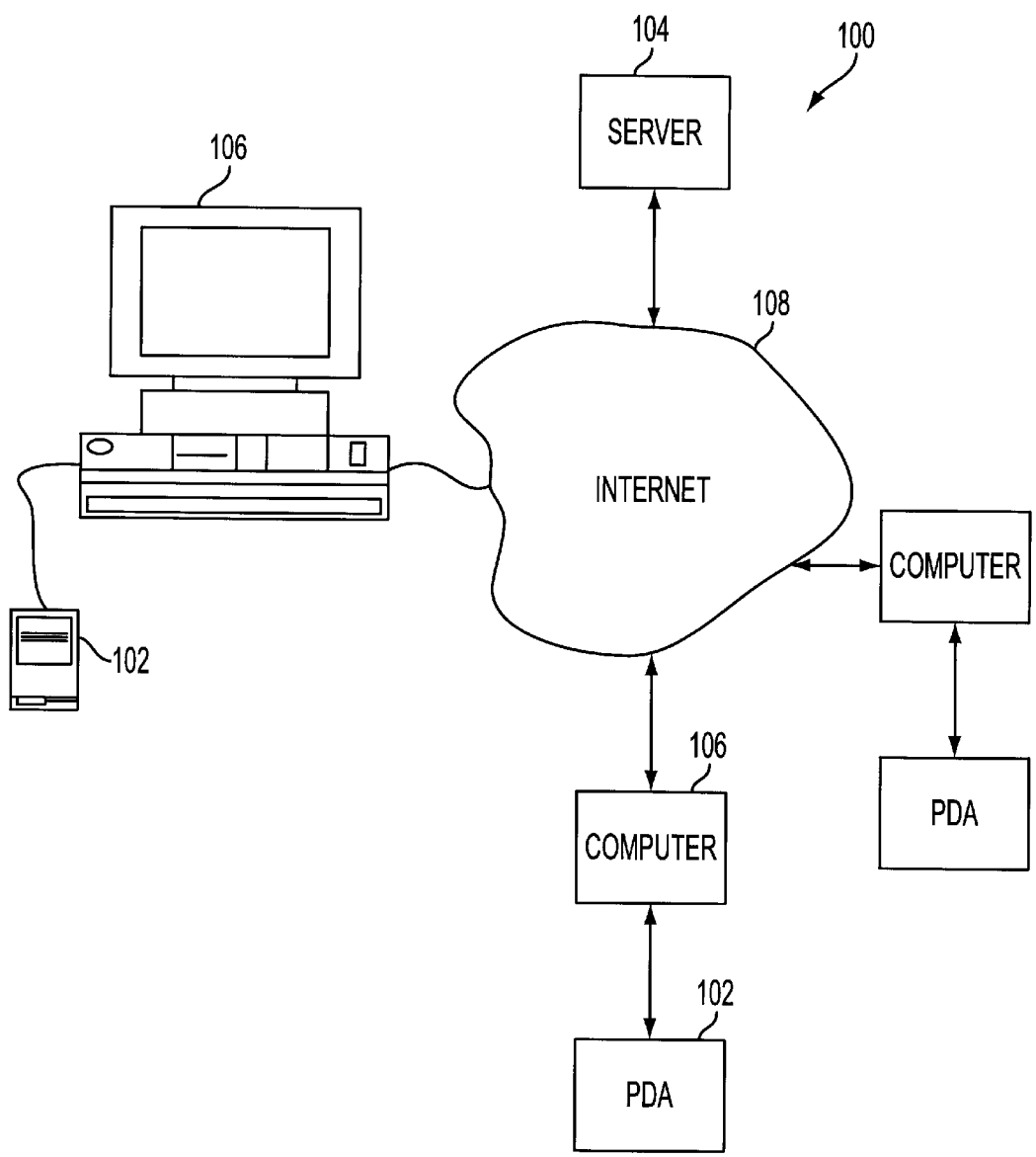
FIG. 1 is a general diagram of the interconnection between a server, a plurality of personal digital assistants, and a plurality of client computers in accordance with one embodiment of the present invention.

With reference to FIG. 1, one embodiment of the present invention includes a system 100 for sharing data among a plurality of users. Included is a plurality of personal digital assistants (PDA's) 102, a server 104, a plurality of client computers 106 each removably connected to the PDA's 102, and a network 108 interconnected between the client computers 106 and the server 104.

The PDA's 102 may include a hand-held Palm™ PDA available from 3Com Corporation. In the alternative, the PDA's 102 may take the form of any other type of portable data storage module which is capable storing, editing, and/or synchronizing sets of personal data. This may be accomplished by any type of I/O mechanisms including, but not limited to a display, a plurality of push buttons, a data port, an electronic writing pad, and/or any other type of I/O mechanism capable of inputting and/or outputting personal data.

In some embodiments, the personal data stored within the PDA's 102 may take the form of calendar information or contact information, i.e. mailing addresses, telephone numbers, facsimile numbers, electronic mail address, scheduled meeting, appointments, etc. In further embodiments, the personal data may include any useful task-oriented information.

With continuing reference to FIG. 1, the server 104 may include any data storage device located in any desired location. The server 104 may even take the form of a conventional computer. During use, the server 104 is capable of synchronizing sets of server data stored thereon with the personal data stored on the PDA's 102. This is carried out upon communication being established between the server 104 and the PDA's 102.

Figure 2:
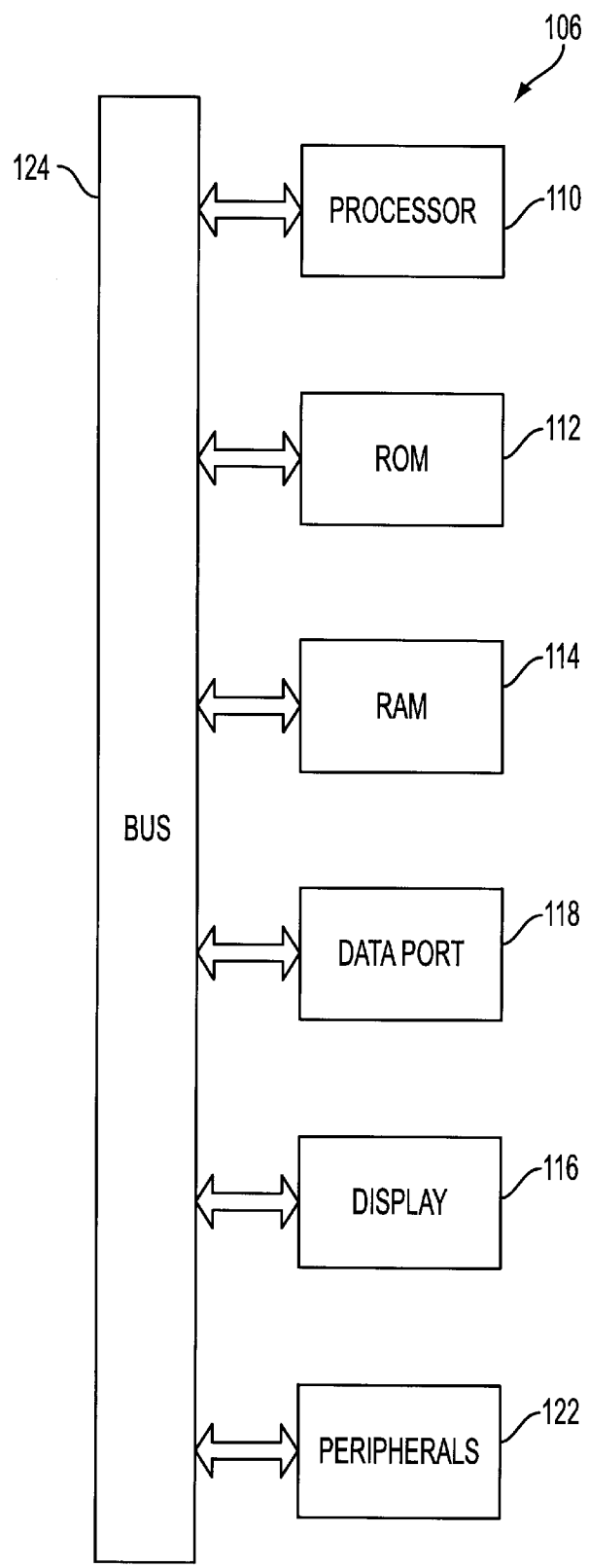
FIG. 2 is a block diagram of an exemplary component configuration for the client computers of FIG. 1.

FIG. 2 shows one embodiment of the client computers 106 to which the PDA's 102 are releasably connected. As shown, each client computer 106 may include a microprocessor 110, read only memory 112, random access memory 114, a display 116, a data port 118, secondary storage memory 120 such as a hard disk drive or a removable floppy disk drive, and/or a plurality of additional I/O peripherals 122. These components are connected by way of at least one bus 124.

In use, the client computers 106 are adapted for allowing communication between the server 104 and the PDA's 102 by providing a communication link therebetween. The coupling between the client computers 106 and the server 104 may, in one embodiment, include a local or wide area network. One example of a network 108 that may be employed for affording the foregoing coupling is the Internet or any other intranet. In other embodiments, other types of coupling may be employed including RF, fiber optic, or any type of transmission medium capable of transferring data and control signals. It should be understood that any of the foregoing types of coupling may also be employed for affording a link between the PDA's 102 and the client computers 106.

In one embodiment, the client computer 106 may be excluded in favor of incorporating the necessary components thereof into either the server 104, the PDA 102, or an unillustrated communication interface device. In such embodiment, the communication link between the server 104 and the PDA 102 may be either a hard-line or wireless.

Figure 3:
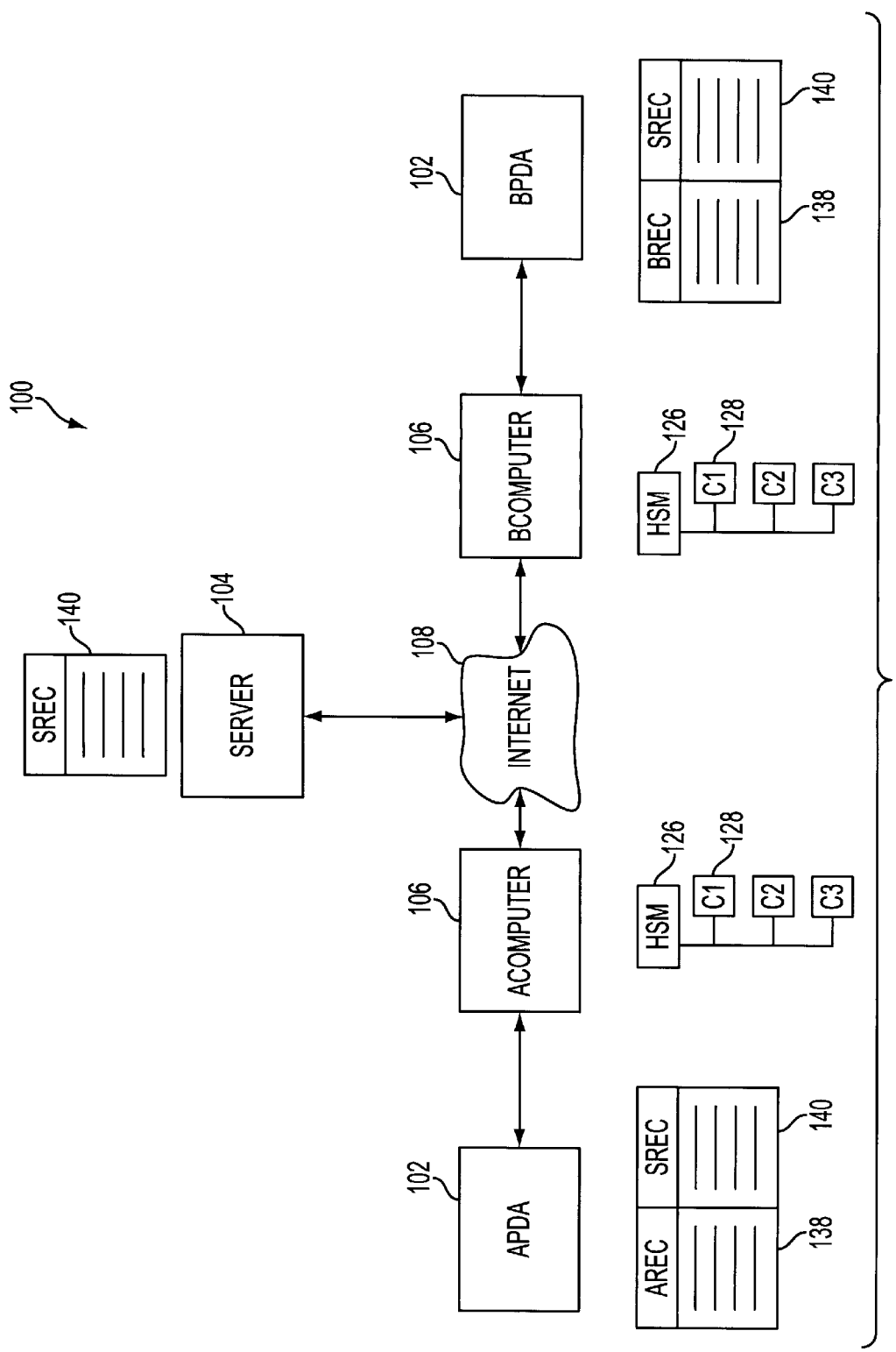
FIG. 3 is a more detailed illustration of the interconnection of the various components shown in FIG. 1.

FIG. 3 depicts the foregoing components interconnected according to one embodiment of the present invention. In order to allow communication between the PDA's 102 and the client computers 106 and server 104, a conduit manager 126 such as Hotsync Manager™ provided by 3Com with Palm™ PDA's is run by each of the client computers 106. The conduit manager is adapted for allowing data on the PDA's 102 to be synchronized with data from other sources such as the server 104.

To accomplish this, the conduit manager 126 includes a plurality of communication links, or conduits 128, as shown in FIG. 3. The conduits 128 are capable of governing synchronization with various data sources and by various methods. For example, the conduits C2 & C3 may be provided by 3Com for interfacing a specific data source. Further, another one of the conduits C1 may be used to implement the method of the present invention. It should be noted that the conduit manager 126 and the conduits 128 may be software implemented using the microprocessor 110 of the associated client computer 106 and computer logic stored in memory. In the alternative, a hardware implementation may be employed.

Specifically, conduit C1 of the present invention may be used to interface both the local memory of the associated client computer 106 and the server 104 in a manner to be set forth later in greater detail. Upon a connection being established between the client computer 106 and the server 104, synchronization is executed. If, however, it is impossible for such connection to be established, a local copy of the synchronization may be stored on the local memory of the client computer 106 to be synchronized with the server 104 at a later time.

As mentioned earlier, the types of personal data that may be stored on the PDA 102 include contact and calendar information. During synchronization, both the contact information and calendar information may be exchanged between different PDA's 102. For example, contact information may be updated on multiple different PDA's 102, calendar information of a plurality of PDA's 102 may be synchronized and conflicts may be addressed, and/or calendar information of a plurality of users may be stored and updated on each PDA 102. In the case wherein calendar information of a plurality of users is stored and updated on each PDA 102, a user may select which calendar information of others that is updated on his or her PDA 102. For more information regarding synchronization of calendar data, reference may be made to a co-pending application entitled "System and Method for Sharing Data Among a Plurality of Personal Digital Assistants" which is incorporated herein by reference.

In order to allow the synchronization and sharing of information between the PDA's 102 in accordance with the present invention, the personal data, server data, and local data each has three fields of information stored therewith. These fields include a name field, an identification field, and an index field. Located in the identification fields of the personal data of the PDA's 102 are personal identification codes 138. Further, server identification codes 140 are located in the identification fields of the server data of the server 104. The personal identification codes 138 are stored on either the PDA's 102, the server 104, or the client computer 106 in which the conduit 128 is resident for correlation purposes during synchronization.

In a preferred embodiment, the personal identification codes 138 are stored on the associated client computer 106. In a more preferred embodiment, the personal identification codes 138 are stored on the server 104. Finally, the personal identification codes 138 are stored on the PDA's 102 in a most preferred embodiment.

FIG. 3 shows the personal identification codes 138 to be correlated with the server identification codes 140 for keeping track of the correspondence between the personal data stored on the PDA's 102 and the server data stored on the server 104. This is especially critical during the synchronization of such data. For more information regarding synchronization of data, reference may be made to a co-pending application entitled "System and Method for Synchronizing Data Among a Plurality of Users Via an Intermittently Accessed Network", which is incorporated herein by reference.

Figure 4:
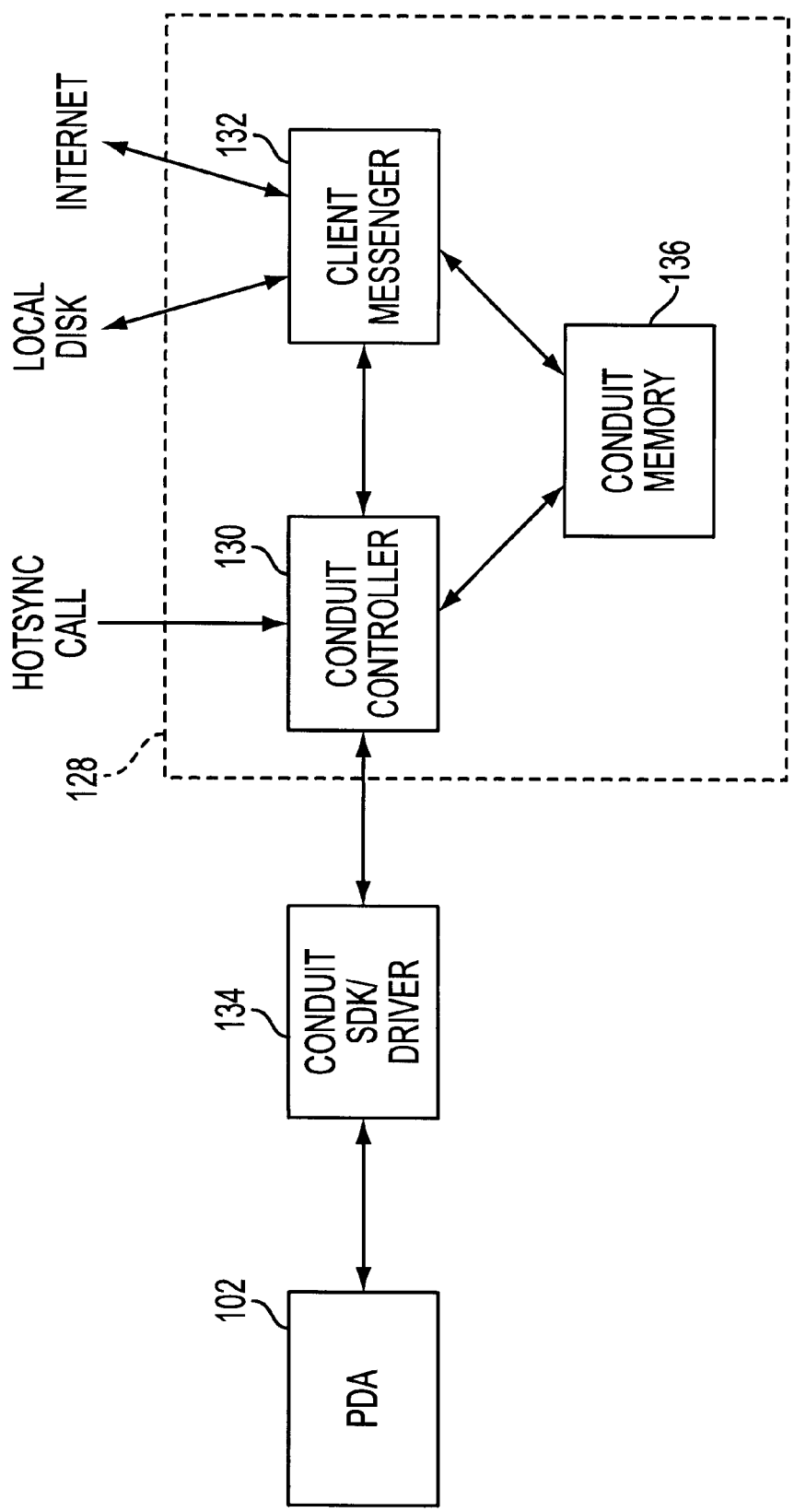
FIG. 4 is a block diagram depicting the conduit controller and the client messenger of the conduit in accordance with one embodiment of the present invention.

FIG. 4 illustrates one of the conduits 128 of the conduit manager 126 of FIG. 3. In use, the conduit 128 of the present invention is adapted for establishing communication between the PDA's 102 and the server 104 to not only synchronize the data of a PDA 102 and a client computer 106, but also synchronize the personal data of different PDA's 102.

To accomplish this, the conduit 128 includes a conduit controller 130 which is directly controlled by the conduit manager 126 and is suitable for interfacing the PDA's 102. The conduit 128 further includes a client messenger 132 in communication with the conduit controller 130 and suitable for interfacing the server 104. It should be noted that the client messenger 132 is further suitable for interfacing local memory of the associated client computer 106 to synchronize local data stored thereon with the personal data and the server data. As mentioned earlier, this is particularly critical when a connection between the conduit controller 130 and the server 104 is nonexistent at the time of synchronization. For more information regarding this feature, reference may be made to a co-pending application entitled "System and Method for Synchronizing Data Among a Plurality of Users Via an Intermittently Accessed Network", which is incorporated herein by reference.

With continuing reference to FIG. 4, it is shown that conduit memory 136 may be connected between the conduit controller 130 and the client messenger 132 for facilitating operation. Further, a conduit driver 134 may be included within the corresponding client computer 106 to act as an interface between the conduit 128 and the PDA's 102. Such conduit driver 134, in one embodiment, may take the form of a conduit SDK which is provided by 3Ccom™ for Palm™ PDA's.

Figure 5:
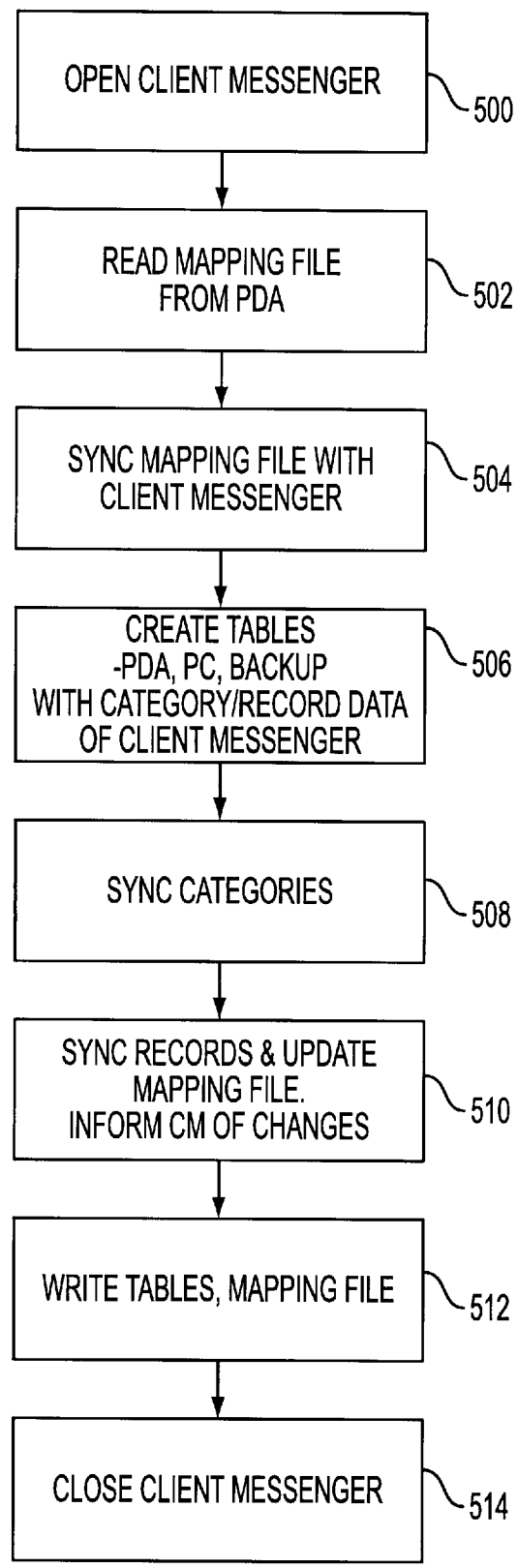
FIG. 5 is a general flowchart delineating the operations carried out by the conduit controller of the conduit shown in FIG. 4 when handling contact information.

With reference now to FIG. 5, a flowchart is illustrated which delineates the procedure executed by one of the components of the present invention, namely the conduit controller 130 of the conduit 128 of FIG. 4. Such procedure relates specifically to the operation of the conduit controller 130 during the synchronization of one particular type of personal data, the contact information. As shown in operation 500, the conduit controller 130 first opens the client messenger 132 after which a mapping file is read from the PDA 102 (in the most preferred embodiment) that is currently connected to the client computer 106 in an operation 502. Such mapping file consists of the personal and server identification codes 140 and the correlation therebetween.

With continuing reference to FIG. 5, the mapping file is then synchronized with the client messenger 132, as indicated by operation 504. As mentioned earlier, the client messenger 132 provides an interface with the server 104 and the local memory of the client computer 106. As such, when the conduit controller 130 synchronizes the mapping file with the client messenger 132, such synchronization actually occurs with respect to the identification codes within the server 104 and local memory. It should be noted that synchronization of the mapping file is critical so that personal data within the PDA's 102 is properly correlated with respect to the data within the server 104 and local memory. Only with proper correlation can the data be properly edited to conform during the synchronization process.

Once the mapping file is synchronized, tables of categories are created by the conduit controller 130 in the conduit memory 136 in operation 506. Such categories include groups of data organized as a function of any of the fields associated with the data, i.e. name, identification, index, etc. Further, a table of categories is generated specifically for the data in the PDA 102, the local memory of the client computer 106, and the server 104. Since the client messenger 132 interfaces the local memory and the server 104, the tables of categories associated with the local memory and the server 104 appear, from the perspective of the conduit controller 130, to be tables associated with the client messenger 132. After the tables of categories have been created in operation 506, the categories of the different tables are synchronized in that "dirty" categories from the PDA table and the client messenger table are adjusted to conform. Note operation 508.

As shown in FIG. 5, once the categories are synchronized, the data, or records, in the categories are synchronized by the conduit controller 130 along with the mapping file in operation 510. Next, in operation 512, the tables of synchronized categories and records, and the mapping file are written to the PDA 102 via the conduit controller 130 and further written to the local memory of the client computer and the server 104 via the client messenger 132. After the tables are written, the client messenger 132 is closed by the conduit controller 130. Note operation 514.

Figure 6:
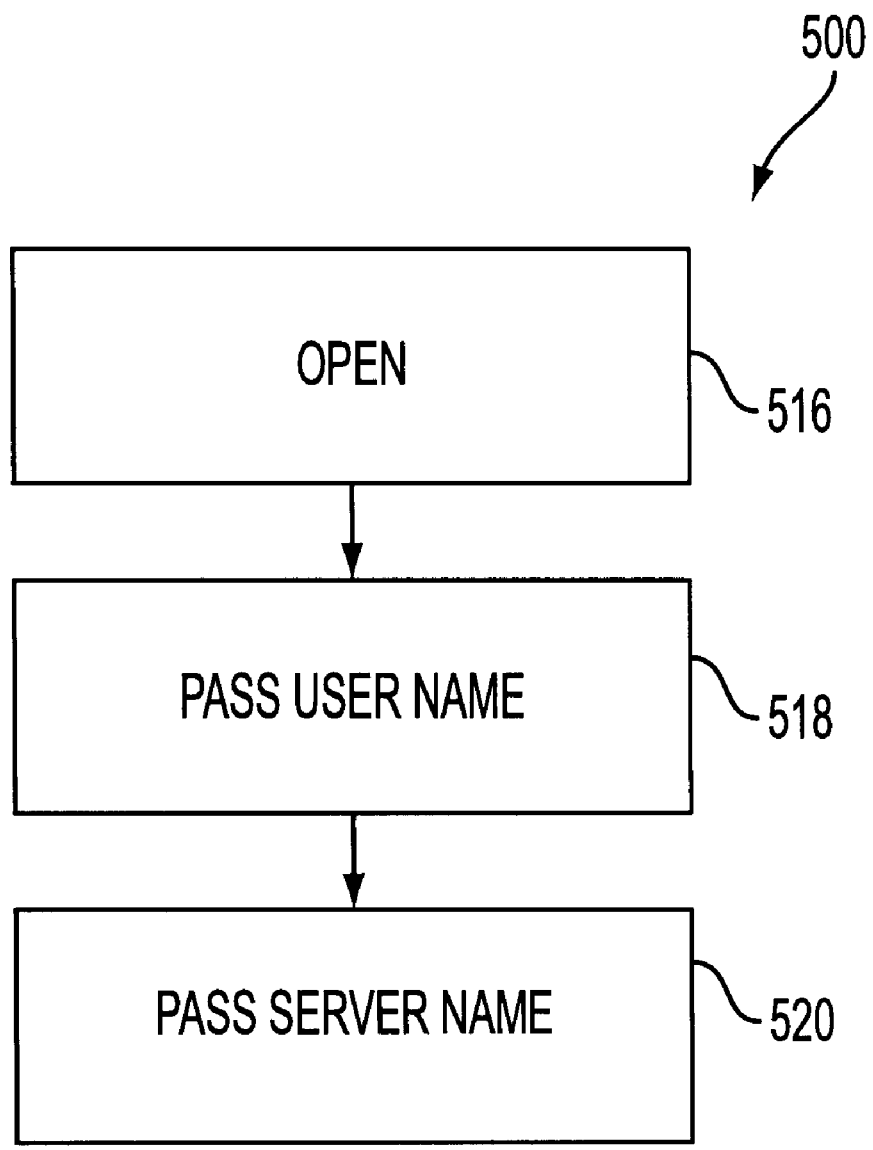
FIG. 6 is a specific flowchart illustrating the details associated with one of the operations of the conduit controller of the conduit shown in FIG. 5.

FIG. 6 shows a more detailed flowchart corresponding to operation 500 in FIG. 5. As shown, when the client messenger 132 is opened in operation 516, the conduit controller 130 passes a user name and a server name in respective operations 518 and 520. It should be noted that the user name corresponds to the PDA 102 of a specific user and the server name corresponds to a server 104 on which the appropriate server data resides.

Figure 7:
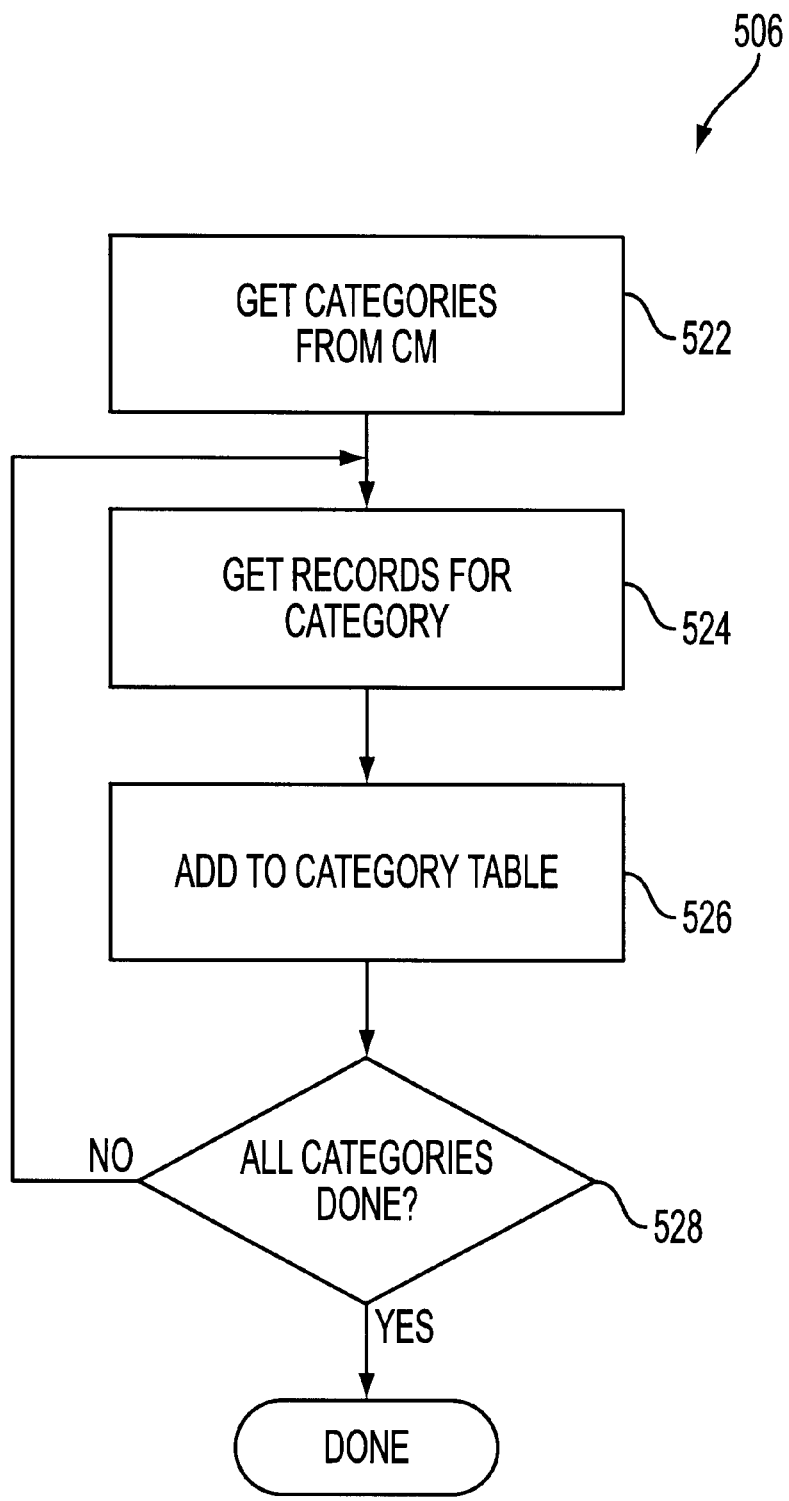
FIG. 7 is a specific flowchart illustrating the details associated with one of the operations of the conduit controller of the conduit shown in FIG. 5.

With reference now to FIG. 7, a more specific flowchart is provided that delineates the details regarding operation 506 in FIG. 5. In operation 522 of FIG. 7, the aforementioned tables are created by first receiving the categories via the client messenger 132. Accompanying the categories are the records which are 115 also retrieved and added to the corresponding table in operations 524 and 526, respectively. This is repeated until each table has a complete listing of the categories and associated records, as indicated by decision 528.

Figure 8:
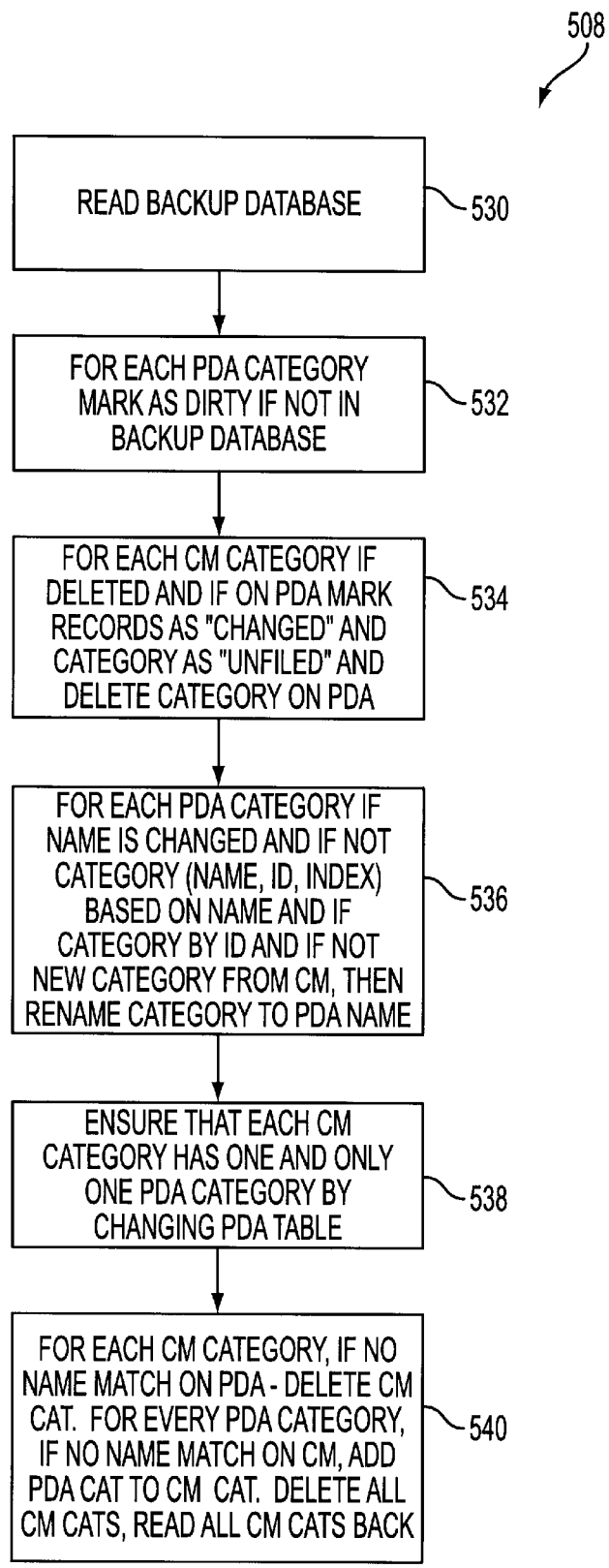
FIG. 8 is a specific flowchart illustrating the details associated with one of the operations of the conduit controller of the conduit shown in FIG. 5.

FIG. 8 is a flowchart delineating in greater detail operation 508 of FIG. 5 wherein the categories are synchronized. First, in operation 530, a back-up database that is resident in the local memory of the client computer 106 is read. Such back-up database may have been generated on the server 104 or client computer 106 after a previous synchronization. Next, the conduit controller 130 performs an operation 532 on each category of the table associated with the PDA 102. In particular, the conduit controller 130 marks each category of the PDA table that is "dirty" or, in other words, has been modified.

With continuing reference to FIG. 8, the conduit controller 130 next performs an operation 534 on each category of the table associated with the client messenger 132. Specifically, if the category of the client messenger table is deleted and exists on the PDA table, the corresponding records are marked as "changed" and the category is marked as "unfiled" after which the corresponding category on the PDA table is deleted.

A subsequent operation, operation 536 of FIG. 8, is performed on each category of the table associated with the PDA 102. During such operation, the conduit controller 130 renames categories of the client messenger table if the PDA category name is not marked as changed and a category by that name does not exist on the client messenger but a category with the same identification code does exist and that category is not marked as a new category from the client messenger.

Operation 538 of FIG. 8 is subsequently carried out for each of the categories of the client messenger table. Operation 538 includes changing the PDA table to ensure that each category of the PDA table has one and only one corresponding category on the client messenger table.

Yet another operation, operation 540, of FIG. 8 is carried out for each of the categories of the client messenger table. Such operation 540 includes deleting a category on the client messenger table if a corresponding category can not be found on the PDA table. Operation 540 of FIG. 8 further has a component which is carried out for each category of the PDA table. Such component includes adding a category of the PDA table to the client messenger table if the name of the category of the PDA table does not have a match on the client messenger table. Finally, all of the categories of the client messenger table are deleted and read back.

Figure 9:
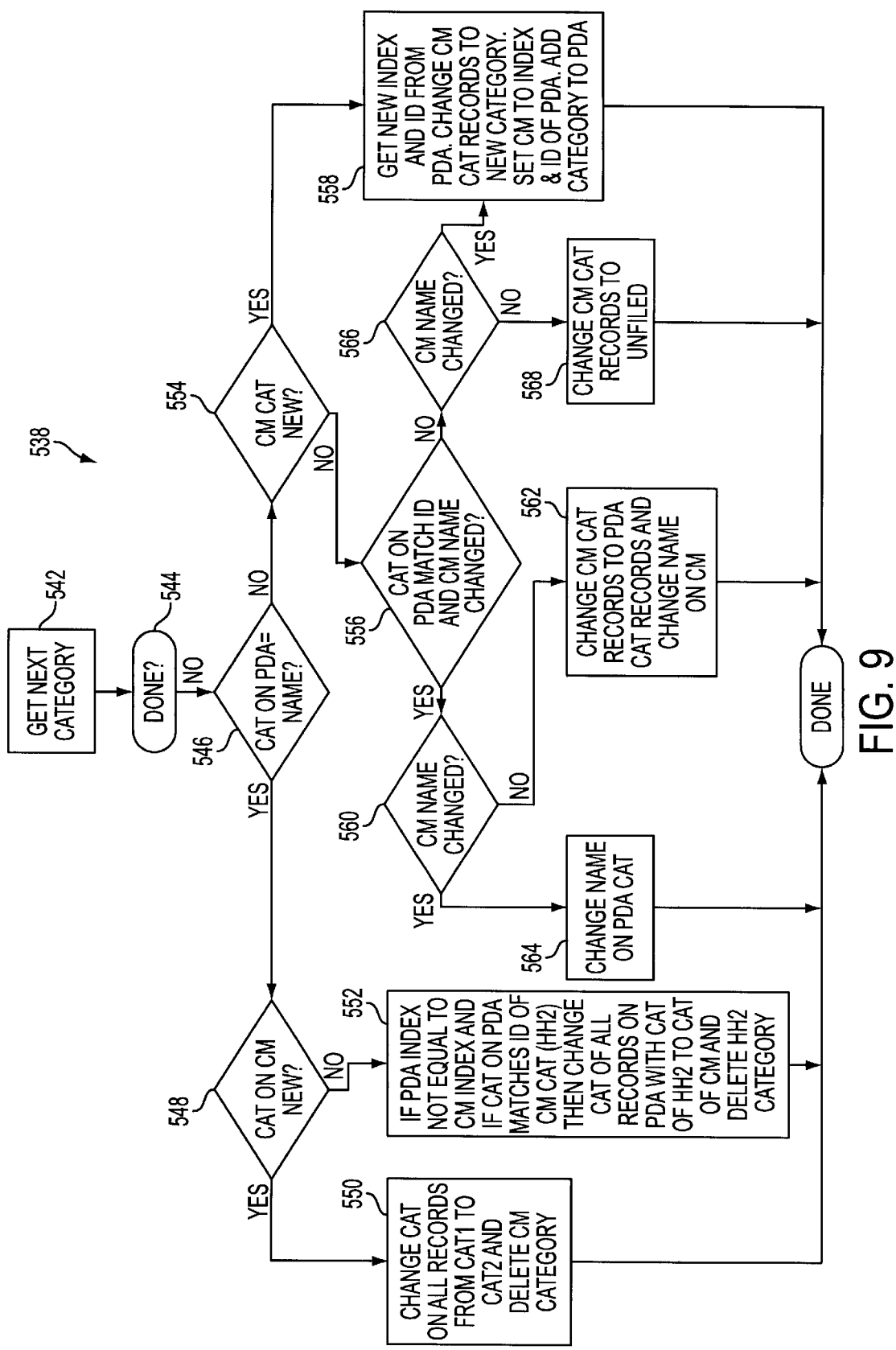
FIG. 9 is a specific flowchart illustrating the details associated with one of the operations of the conduit controller of the conduit shown in FIG. 8.

With reference now to FIG. 9, a specific flowchart is provided illustrating the details associated with operation 538 shown in FIG. 8. As mentioned earlier, operation 538 of FIG. 8 includes changing the PDA table to ensure that each category of the PDA table has one and only one corresponding category on the client messenger table. The flowchart of FIG. 9 begins by retrieving each category of the client messenger table, as indicated in operation 542. Next, in decision 546, it is determined whether the name of a category on the PDA table matches that of a category on the client messenger table.

If it turns out that a match is found in decision 546 in FIG. 9, it is next determined whether the category on the client messenger table is new in decision 548. If it is, the category of the client messenger table is renamed and subsequently deleted. Note operation 550 of FIG. 9. If, however, the category on the client messenger table is not new, the category on the PDA table is changed to reflect the corresponding category of the client messenger table, as indicated in operation 552 of FIG. 9. It should be noted that such operation 552 is executed only if the index of the category of the PDA table is not equal to that of the client messenger table and further the identification code of the category of the PDA table matches that of the client messenger table.

Similar to decision 548 of FIG. 9, if it turns out that a match is not found in decision 546, it is next determined whether the category on the client messenger table is new in decision 554. If it is, a new index and identification code is retrieved based on the PDA table in operation 558 after which the category of the client messenger table is changed to reflect the new index and identification code. Also in operation 558, the category of the client messenger table is added to the PDA table.

On the other hand, if the category on the client messenger table is determined not to be new in decision 554 of FIG. 9, it is then determined in decision 556 whether the category of the PDA 102 has an identification code that matches that of the category of the client messenger table. It is also determined in decision 556 whether the name of the category of client messenger table has changed.

If the answer to decision 556 of FIG. 9 is "Yes", yet another decision, decision 560, is determined, namely whether the name of the category of the client messenger table has changed. If the answer to decision 560 is "Yes", the name of the category of the PDA 102 is changed accordingly in operation 564. If, however, the name of the category of the client messenger table has not changed and the answer to decision 560 is "No", the records of the category of the client messenger table are changed to those of the category of the PDA table after which the name of the category of the client messenger table is changed. See operation 562 of FIG. 9.

If the answer to decision 556 of FIG. 9 is "No", yet another decision, decision 566, is determined, namely whether the name of the category of the client messenger table has changed. If the answer to decision 566 is "Yes", operation 558 is carried out in a manner already described hereinabove. If, however, the name of the category of the client messenger table has not changed and the answer to decision 560 is "No", the records of the category of the client messenger table are changed to unfiled in operation 568.

Figure 10:
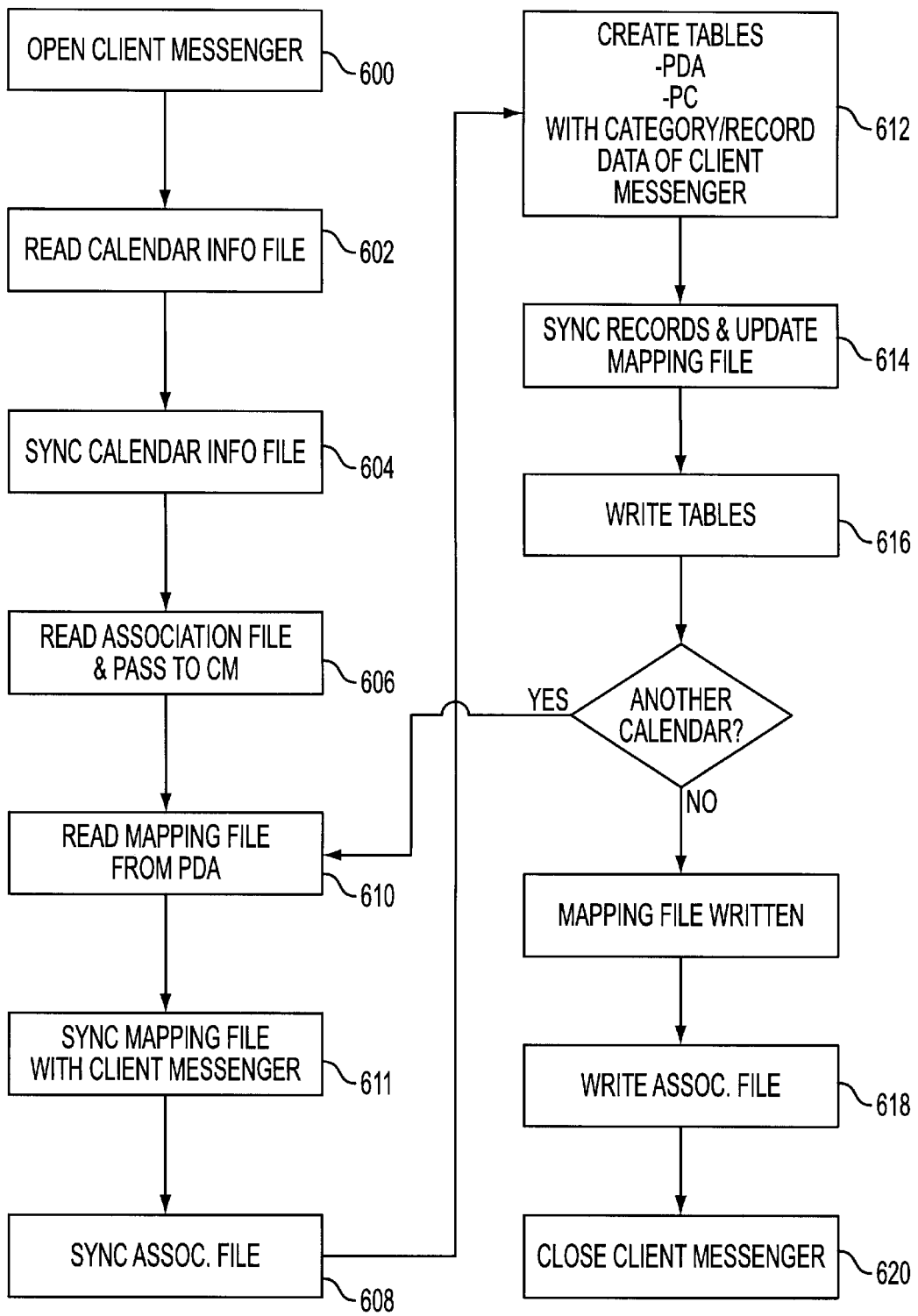
FIG. 10 is a general flowchart delineating the operations carried out by the channel conduit of the conduit shown in FIG. 4 when handling calendar information.

With reference now to FIG. 10, a flowchart is illustrated which delineates another procedure executed by the conduit controller 130 of the conduit 128 of FIG. 4. As opposed to the procedure delineated in FIG. 5, the procedure shown in FIG. 10 relates to the synchronization of a different type of data, namely the calendar information. In comparison to the flowchart of FIG. 5, the present flowchart differs in the addition of a few operations. For example, after the client messenger 132 is opened in operation 600, a calendar information file is read in operation 602 after which the calendar information file is synchronized in operation 604. Next, an association file is read and passed to the client messenger 132 in operation 606.

With continuing reference to FIG. 10, yet another additional operation, operation 608, follows the synchronization of the mapping file with the client messenger 132. In operation 608, the aforementioned association file is synchronized. Operations 610–616 are continued until each calendar is completed. Further, in addition to writing the mapping files, the association files are also written, as indicated in operation 618. It should be noted that each of the remaining operations delineated in FIG. 10 are the same as the corresponding operations of FIG. 5 as described in detail hereinabove with the exception of the type of data that is synchronized.

Figure 11:
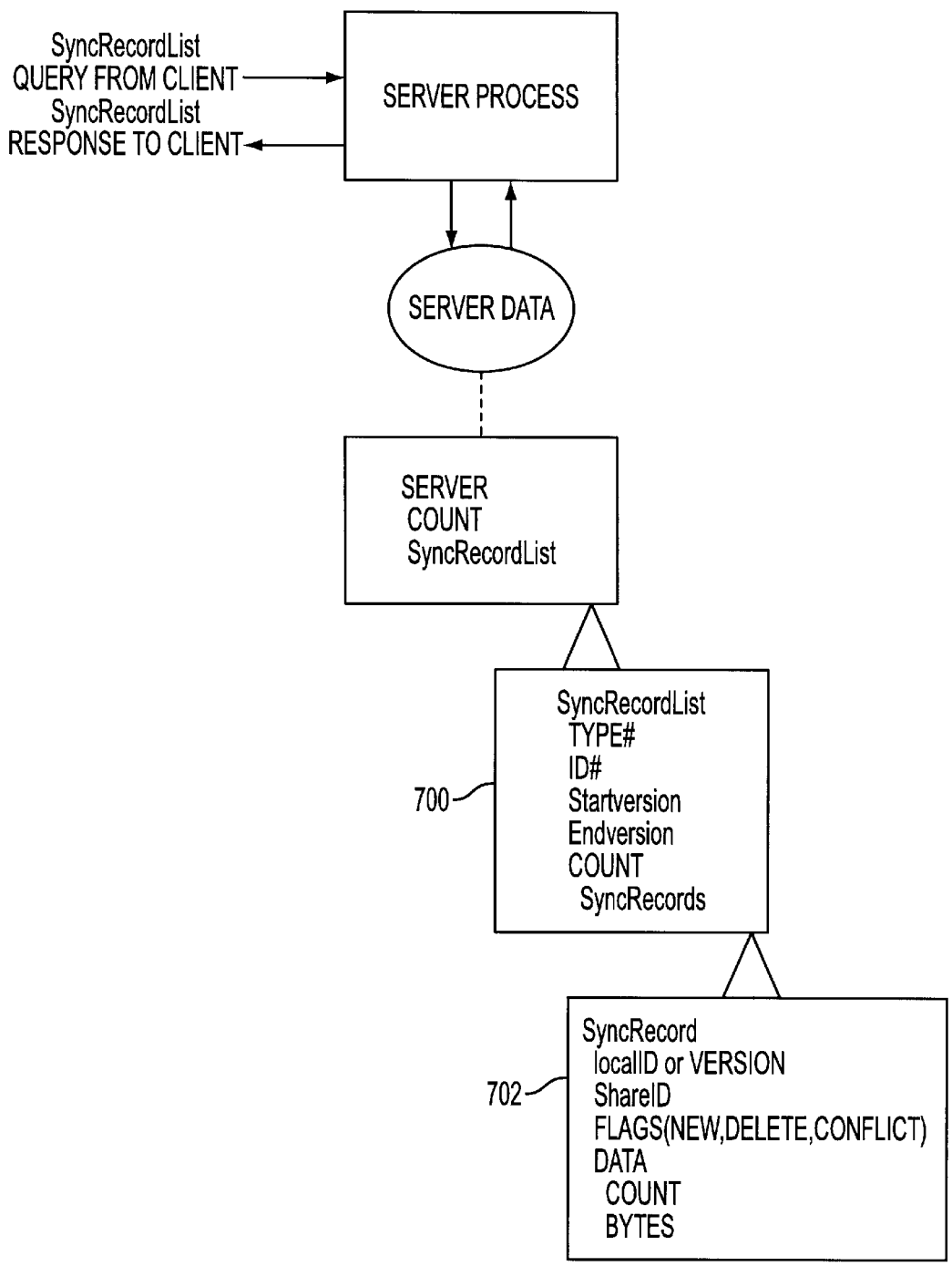
FIG. 11 is a general flowchart delineating the data structure and operations carried out by the server shown in FIGS. 1 and 3.

FIG. 11 illustrates the various server data that is stored on the server 104. Such data includes a plurality of record lists, or SyncRecordLists 700, that are communicated with the PDA's 102 via the conduit 128 of FIGS. 3 and 4. The record lists include information such as a type number, an identification number, a start version number, an end version number, etc. Further, the record lists contain records, or SyncRecords 702, each including a local identification code; a shared identification code identifying users with whom data is shared; flags to indicate new, deleted, and conflicted information; etc. In addition, each of the records includes any information that has changed since the last synchronization.

Figure 12:
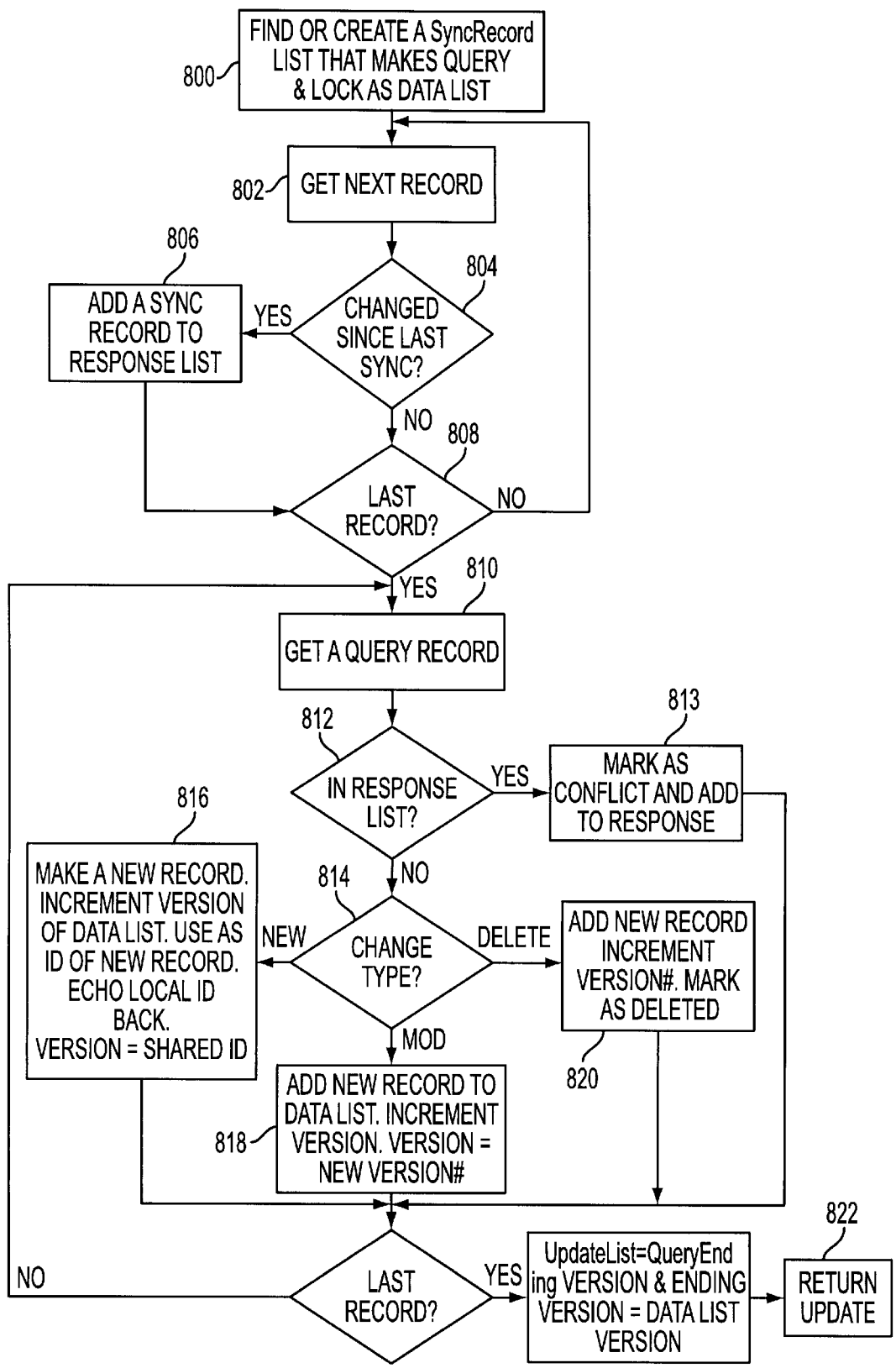
FIG. 12 is a specific flowchart illustrating the details associated with one of the operations of the server shown in FIG. 11.

With reference to FIG. 12, a flowchart is provided which delineates the process associated with the server 104 of the present invention. As shown, the process begins with operation 800 wherein a specific record list, SyncRecordList, of records, or SyncRecords, is found or created in response to a query made by a conduit 128. A loop is then executed during which the records are retrieved in operation 802 and then monitored in decision 804 to determine whether records have changed since the last synchronization. If changes have occurred on the record, such record is added to the record list as indicated in operation 806. It should be noted that only changed information is included in the added record. The loop continues until all of the records have been checked for changes in decision 808.

With continuing reference to FIG. 12, the process associated with the server 104 continues with operation 810 wherein a query record is retrieved. If the query record is resident in a response list as indicated in decision 812, the record is marked as conflicted and is dealt with in operation 813. If, however, the query record is not in the response list, it is next determined what type of change has occurred in decision 814.

If a "new" change has occurred, a new record is made and the version number of the record list is incremented. See operation 816 in FIG. 12. It should be noted that this incremented version number is used as an identification code for the new record. If a "modified" change has occurred, a new record is added to the record list and the version number is incremented, as indicated in operation 818. Finally, operation 820 is carried out if a "delete" change has occurred. In such case, a new record is added to the record list, the version number is incremented, and the record is marked as deleted. The forgoing process is continued until no more records exist. Finally, the update is returned in operation 822.

Up to now, the operation of the conduit controller 130 and the server 104 has been set forth. As mentioned earlier, the conduit controller 130 creates tables of categories and records and subsequently synchronizes such information. When carrying out such processes, the conduit controller 130 communicates with the server 104 (via the client messenger 132) by way of queries which are handled in a manner shown in FIGS. 7 and 8 regarding the server. Focus will now be given to the manner in which the client messenger 132 of the conduit 128 provides an interface between the conduit controller 130 and the server 104.

Figure 13:
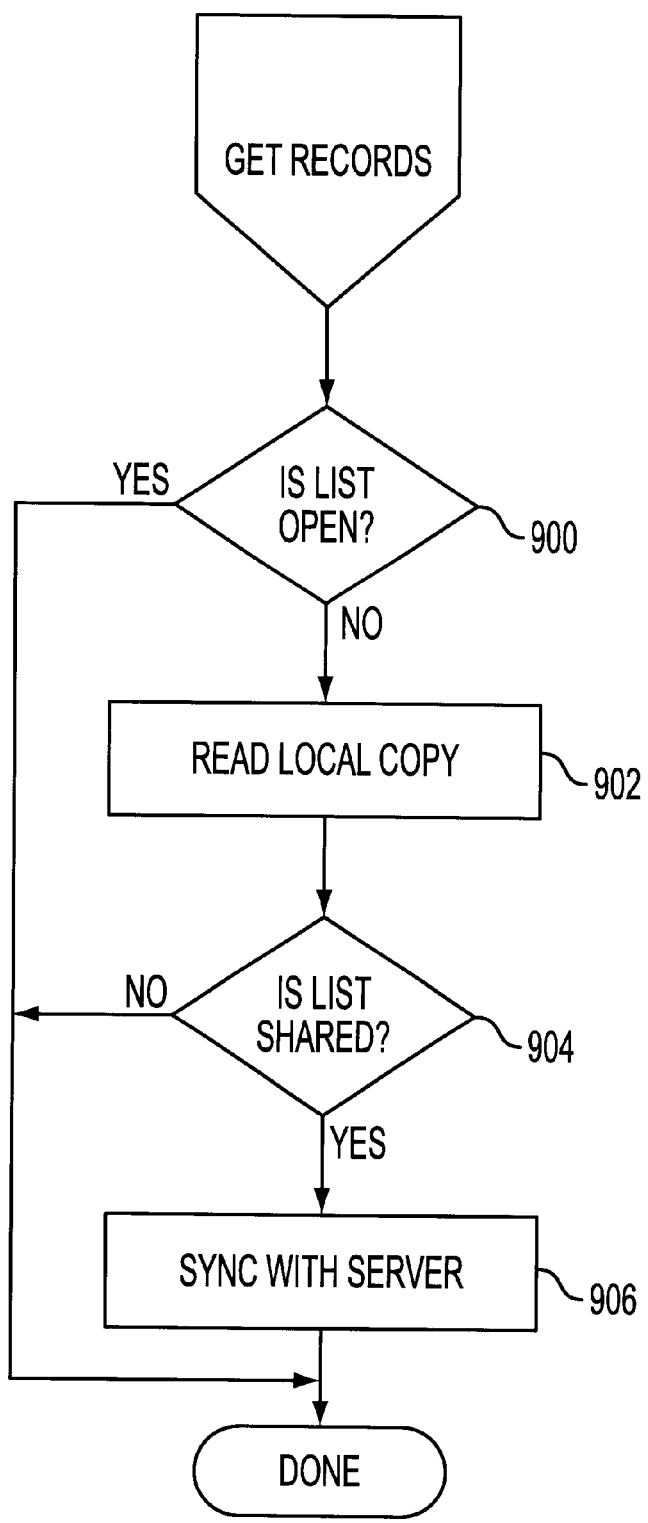
FIG. 13 is a specific flowchart illustrating the details associated with the operation of the client messenger during at least one of the operations of the conduit controller of the conduit shown in FIGS. 5 and 6.

FIG. 13 is a specific flowchart illustrating the details associated with the operation of the client messenger 132 during one of the operations of the conduit controller 130 of the conduit 128 shown in FIGS. 5 and 6, respectively. In particular, FIG. 13 delineates, in detail, the process associated with the client messenger 132 during operations (504 & 510) and (606, 611, & 612) of the conduit controller 130 shown in FIGS. 5 and 6, respectively. First, it is determined whether the record list is open in decision 900. A local copy is read if the list is not open in operation 902. If the list is open, the process of FIG. 13 is complete. Next, it is determined whether the record list is shared in 904. As indicated in operation 906, a synchronization is carried out with the server 104 if the list is shared. If the list is not shared, the process of FIG. 13 is complete.

Figure 14:
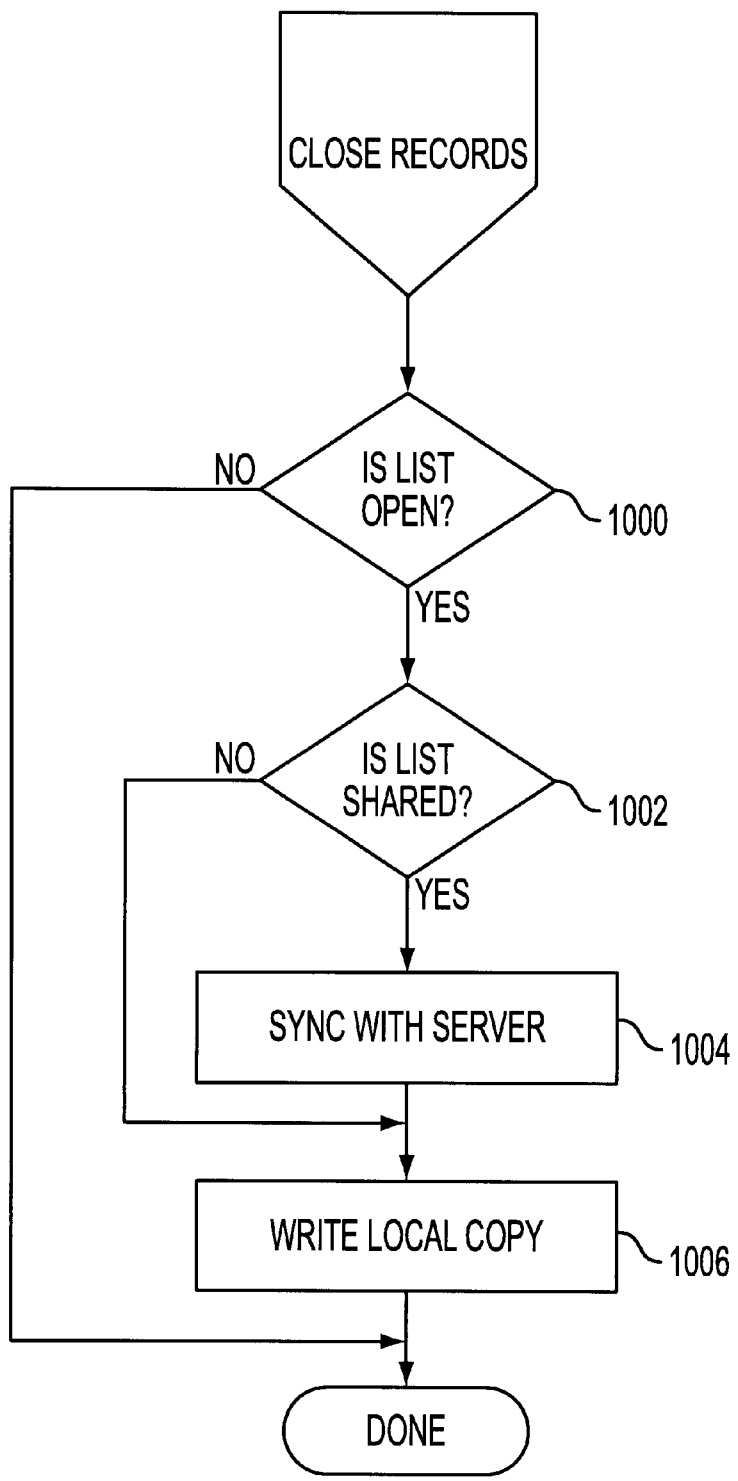
FIG. 14 is a specific flowchart illustrating the details associated with the operation of the client messenger during at least one of the operations of the conduit controller of the conduit shown in FIGS. 5 and 6.

Similar to FIG. 13, FIG. 14 is a specific flowchart illustrating the details associated with the operation of the client messenger 132 during one of the operations of the conduit controller 130 of the conduit 128 shown in FIGS. 5 and 6, respectively. In particular, FIG. 14 delineates, in detail, the process associated with the client messenger 132 during operations 514 and 620 of the conduit controller 130 shown in FIGS. 5 and 6, respectively.

As shown in FIG. 14, it is first determined whether the record list is open in decision 1000. If the record list is not open, the process of FIG. 14 is done. If the record list is indeed open, it is subsequently checked whether the record list is shared in decision 1002. If the record list is shared, a synchronization is carried out with the server 104 in operation 1004 after which a local copy is written in operation 1006. If the record list is not shared, only operation 1006 is carried out. It should be noted that the local copy generated in FIG. 14 is critical in the case wherein a connection to the server 104 is non-existent. In such situation, the appropriate synchronization is carried out between the local copy and the server 104 once communication is established.

Figure 15:
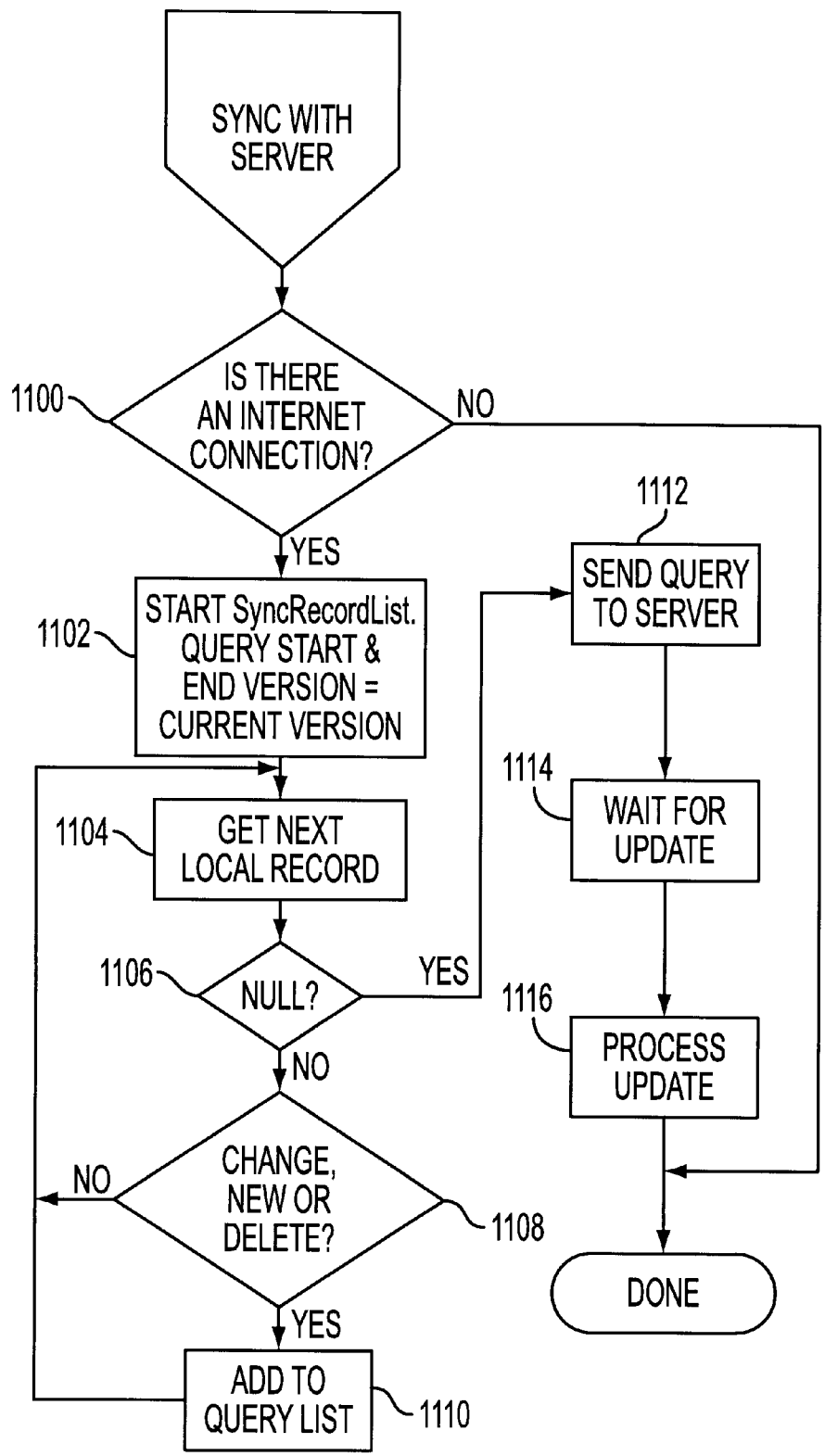
FIG. 15 is a specific flowchart illustrating the details associated with the operation of the client messenger during one of the operations shown in FIGS. 9 and 10.

With reference now to FIG. 15, illustrated is a detailed process of the client messenger 132 that is executed during operations 906 and 1004 of the client messenger 130 shown in FIGS. 9 and 10, respectively. The process of FIG. 15 begins by determining whether a connection with the server 104 exists in decision 1100. As mentioned earlier, such connection may be made by any means including the Internet. Once it is ascertained that a connection exists, a record list, or SyncRecordList, is started in a manner that will be set forth later in greater detail. See operation 1102 of FIG. 15. Once the record list is started, a loop begins with the retrieval of a next local record in operation 1004. As long as the record is not null as determined in decision 1106, a determination is made whether the record represents a change from a previous synchronization in operation 1108 and, if so, is added to the record list in operation 1110.

As shown in FIG. 15, if it is determined that the current record is null in decision 1106, the query is sent to the server 104 in operation 1112 after which the client messenger 132 waits for an update in operation 1114. Finally, a process update in operation 1116 is carried out in a manner to be set forth later in greater detail.

Figure 16:
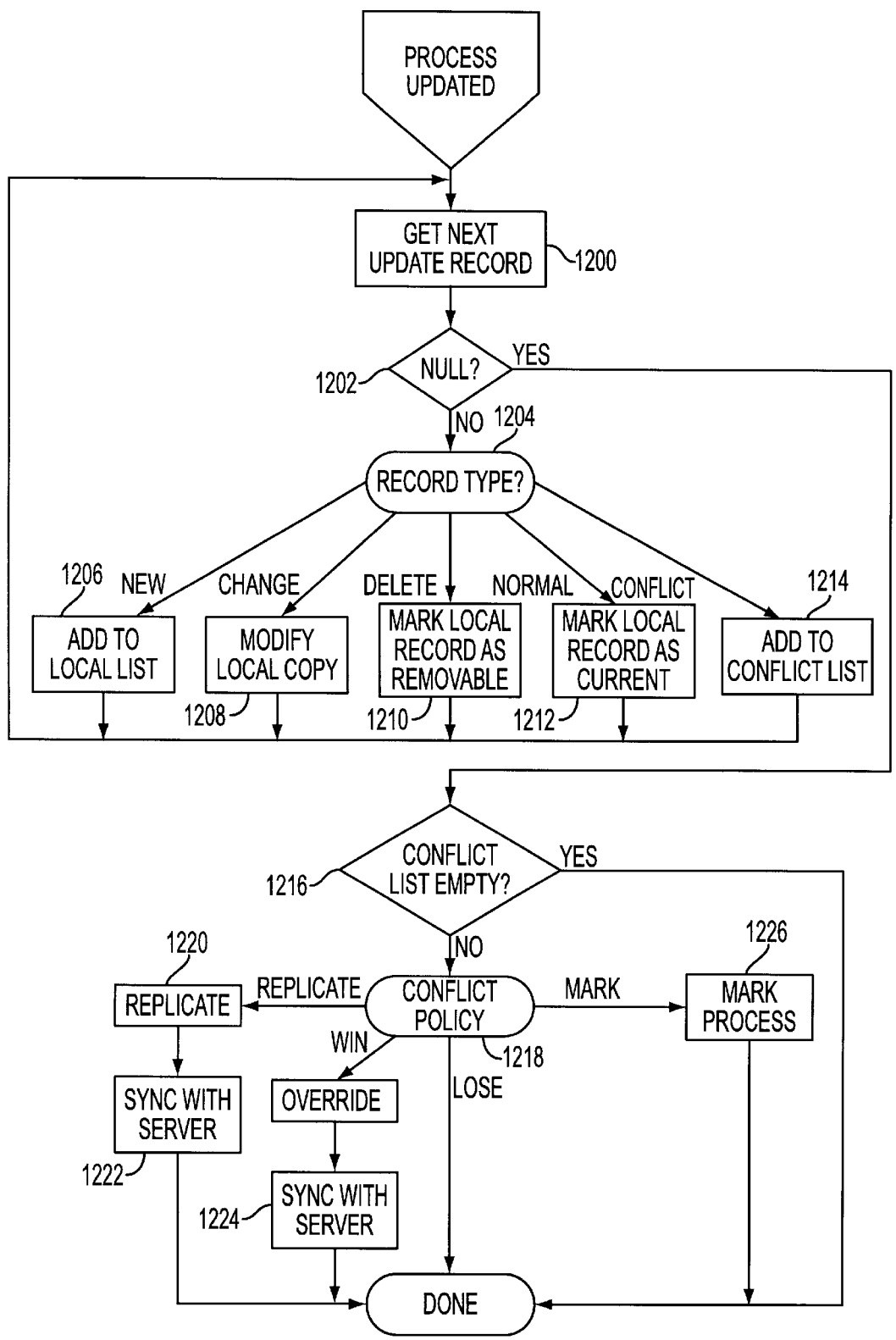
FIG. 16 is a detailed flowchart illustrating one of the operations of the client messenger shown in FIG. 15.

In FIG. 16, a detailed flowchart is shown illustrating one of the operations of the client messenger 132 shown in FIG. 15, namely the process update in operation 1116. As shown, the process update operation begins by getting a next update record in operation 1200. If the record type is not null as determined by decision 1202, a number of operations may take place depending on the type of record retrieve.

For example, if the decision 1204 of FIG. 16 determines that the record is new, the record is added to a local list. Note operation 1206. If, however, the record is changed, a local copy of the record is changed in operation 1208. In operations 1210 and 1212, the local copy of the record is marked as removable and current, respectively. Finally, if the record is conflicted, it is added to a conflict list in operation 1214. By marking the various records in the foregoing manner, the appropriate action may be taken by the server 104 during synchronization.

With continuing reference to FIG. 16, the illustrated process is continued upon the update record being determined to be null by decision 1202. Once it has been determined that the conflict list is not empty by decision 1216, it then determined in decision 1218 what type of conflict policy governs the way in which the conflicted records are managed. It should be noted that a conflict occurs when particular personal data of a first one of the PDA's 102 is synchronized with the server data before the particular personal data of a second one of the PDA's 102 is synchronized with the server data, and the particular personal data of the first and second PDA's 102 are marked to be shared.

As shown in FIG. 16, with a replicate policy, the conflict is resolved by replicating the particular personal data in operation 1220 after which a synchronization is carried out with the server 104, as indicated by operation 1222. With a PDA override policy, the conflict is resolved by synchronizing the conflicted personal data of the PDA 102 with the server data. Similar to the previous policy, a synchronization is executed with the server 104, as indicated by operation 1224. With a server override policy, the conflict is resolved by not synchronizing the conflicted personal data of the PDA 102 with the server data. Finally, the conflict is resolved by marking the conflicted personal data of the PDA 102 for allowing a user to later rectify the conflict via a user interface, as indicated in operation 1226. This last policy is referred to as a marking policy.

Figure 17:
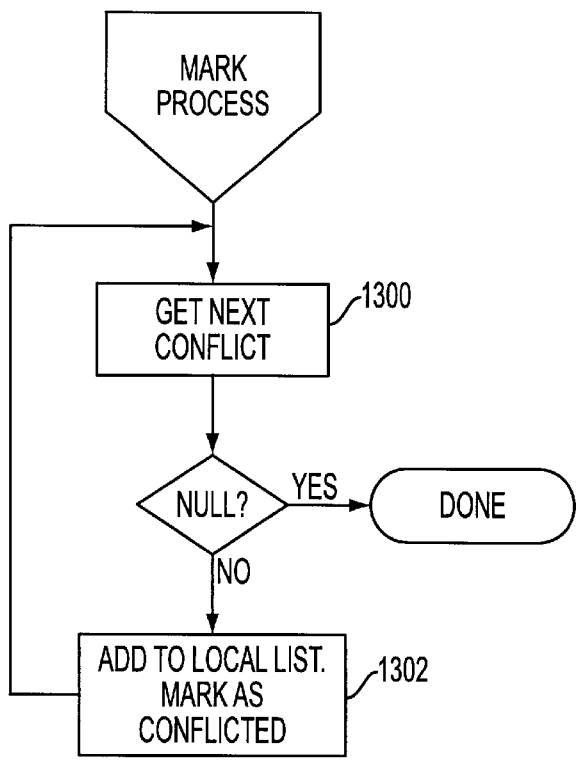
FIG. 17 is a detailed flowchart illustrating one of the operations of the client messenger shown in FIG. 16.
Figure 18:
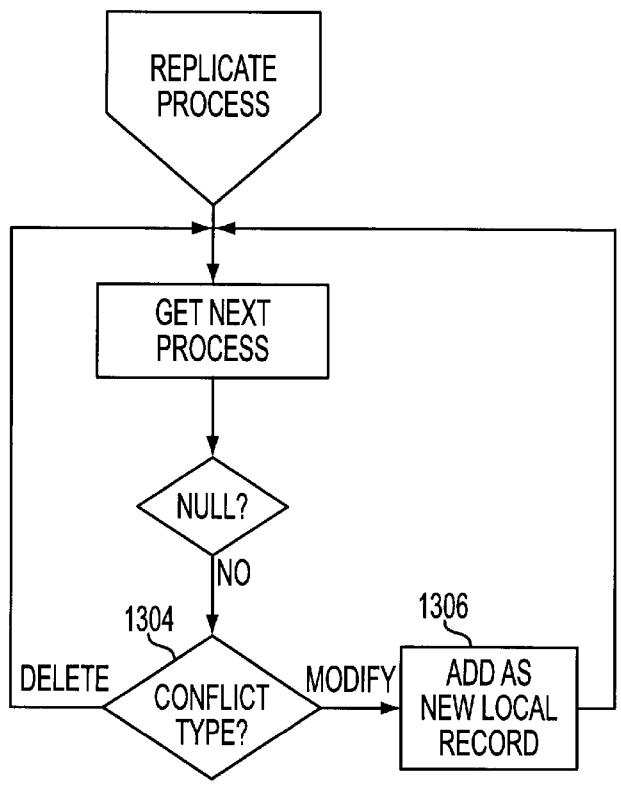
FIG. 18 is a detailed flowchart illustrating one of the operations of the client messenger shown in FIG. 16.
Figure 19:
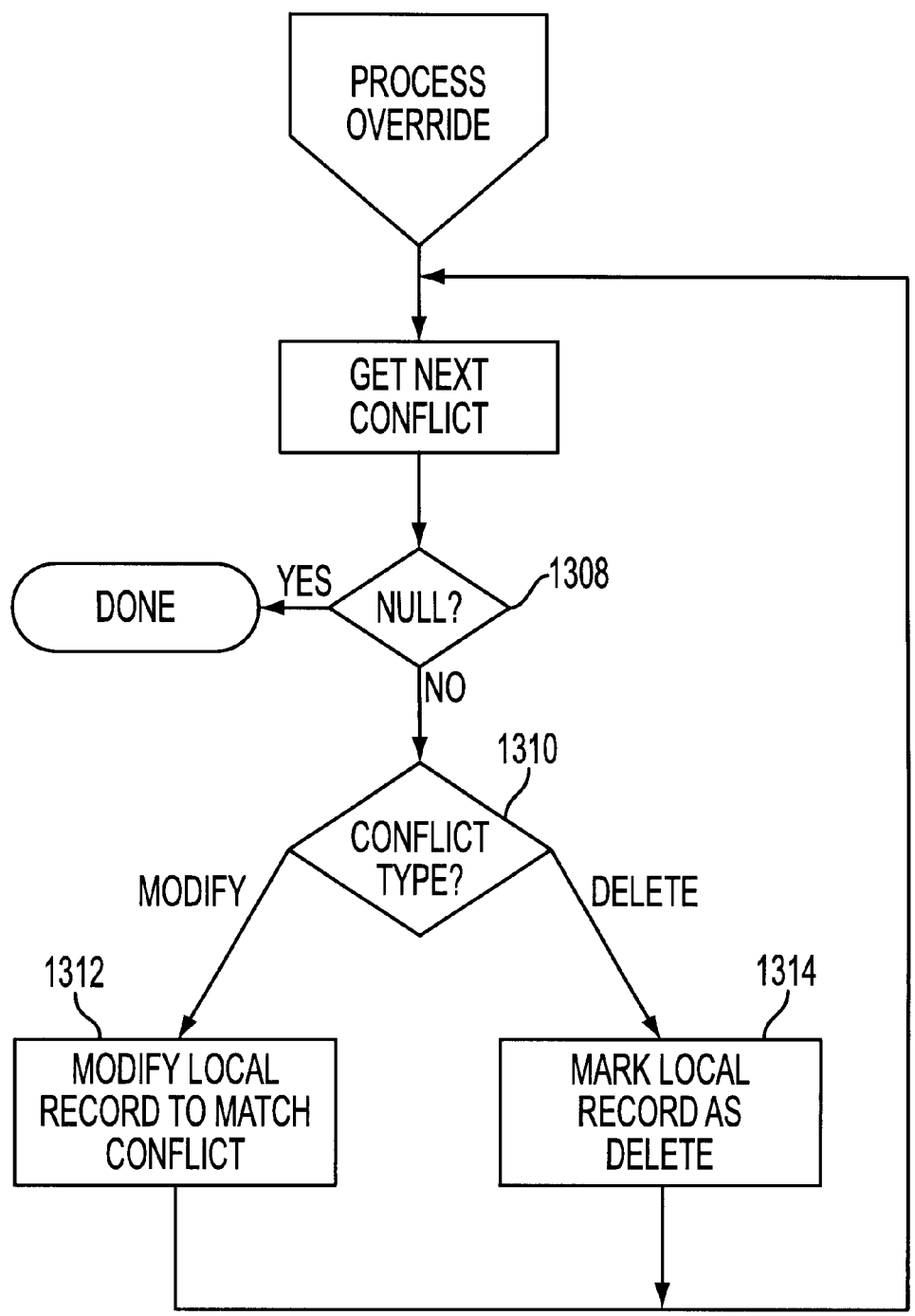
FIG. 19 is a detailed flowchart illustrating one of the operations of the client messenger shown in FIG. 16.

The specific processes related to each of the foregoing policies of dealing with conflicted data will now be set forth with specific reference to FIGS. 17–19. As shown in FIG. 17, the marking policy begins by getting a next conflicted record and adding the same to a local record list marked as conflicted. Note operations 1300 and 1302. This is continued until there are no more remaining conflicted records. With reference to FIG. 18, the replicate policy is delineated wherein once a next conflicted record is retrieved which is not null, it is determined whether the conflicted record is marked as being deleted or modified in decision 1304. If modified, a new local record is added. See operation 1306.

In FIG. 19, the override policy of FIG. 16 is delineated. After retrieving a next conflicted record which is not null in operation 1308, it is determined whether the conflicted record is a deleted or modified record in decision 1310. If the conflicted record is modified, the local record is modified to match the conflicted record in operation 1312. If, however, the conflicted record is deleted, the local record is marked as deleted as indicated by operation 1314.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A system for sharing data among a plurality of users comprising:

a plurality of portable data storage modules each suitable for storing a plurality of personal data sets thereon;

a server including a plurality of server data sets stored thereon; and a communication link between the portable data storage modules and the server for synchronizing the server data sets with the personal data sets in order to obtain the personal data set of one portable data storage module on another portable data storage module, thereby synchronizing the personal data sets between different portable data storage modules wherein the synchronization of the personal data sets between different portable data storage modules only occurs on personal data sets that are to be shared;

said personal data sets of each of the portable data storage modules having personal identification codes assigned thereto and the server data sets of the server having server identification codes assigned thereto, wherein a correlation between the personal identification codes and the server identification codes is stored on at least one of the portable data storage module, the server, and a computer in which the communication link is resident for identification purposes during synchronization of the personal data sets and the server data sets.

2. The system as recited in claim 1, wherein the personal data sets include task oriented information.

3. The system as recited in claim 2, wherein the personal data sets include at least one of contact and calendar information.

4. The system as recited in claim 1, wherein the communication link is resident in a client computer and is connected to the server via a network.

5. The system as recited in claim 4, wherein the network is at least one of the Internet and an intranet.

6. The system as recited in claim 1, wherein the communication link includes a link controller suitable for interfacing the portable data storage modules, and a client messenger in communication with the link controller and suitable for interfacing the server.

7. The system as recited in claim 6, wherein the client messenger is further suitable for interfacing local memory for synchronizing a plurality of local data sets stored thereon with the personal data sets and the server data sets.

8. The system as recited in claim 1, wherein the personal data sets and the server data sets each has three fields of information stored therewith including a name field, an identification field, and an index field for facilitating synchronization.

9. The system as recited in claim 1, wherein the correlation is stored on the portable data storage modules.

10. The system as recited in claim 1, wherein the synchronization of the personal data sets of different portable data storage modules only occurs on personal data sets specifically marked to be shared by including the server identification codes of the personal data sets of other portable data storage modules.

11. The system as recited in claim 1, wherein a conflict occurs when particular personal data sets of a first one of the portable data storage modules is synchronized with the server data sets before the particular personal data sets of a second one of the portable data storage modules is synchronized with the server data sets, and the particular personal data sets of the first and second portable data storage modules are marked to be shared.

12. The system as recited in claim 11, wherein the conflict is resolved by marking the particular personal data sets of the second portable data storage module and alerting a user of the conflict via a user interface.

13. The system as recited in claim 11, wherein the conflict is resolved by replicating the particular personal data sets.

14. The system as recited in claim 11, wherein the conflict is resolved by synchronizing the particular personal data sets of the second portable data storage module with the server data sets.

15. The system as recited in claim 11, wherein the conflict is resolved by not synchronizing the particular personal data sets of the second portable data storage module with the server data sets.

16. A method for sharing data among a plurality of users comprising the operations of:

storing a plurality of personal data sets on a plurality of portable data storage modules;

establishing a communication link between at least one of the data storage modules and a server;

obtaining the personal data set of one portable data storage module on another portable data storage module by synchronizing the personal data sets with a plurality of server data sets stored on the server wherein the synchronization of the personal data sets between different portable data storage modules only occurs on personal data sets that are to be shared, said personal data sets of each of the portable data storage modules having personal identification codes assigned thereto and the server data sets of the server having server identification codes assigned thereto; and accessing a correlation between the personal identification codes and the server identification codes that is stored on at least one of the portable data storage module and the server.

17. The method as recited in claim 16, wherein a conflict occurs when particular personal data sets of a first one of the portable data storage modules is synchronized with the server data sets before the particular personal data sets of a second one of the portable data storage modules is synchronized with the server data sets, and the particular personal data sets of the first and second portable data storage modules are marked to be shared.

18. The method as recited in claim 16, wherein the personal data sets include task-oriented information.

19. The method as recited in claim 18, wherein the personal data sets include at least one of contact and calendar information.

20. The method as recited in claim 16, wherein the communication link is resident in a client computer and is connected to the server via a network.

21. The method as recited in claim 20, wherein the network is at least one of the Internet and an intranet.

22. The method as recited in claim 16, wherein the communication link includes a link controller suitable for interfacing the portable data storage modules, and a client messenger in communication with the link controller and suitable for interfacing the server.

23. The method as recited in claim 22, wherein the client messenger is further suitable for interfacing local memory for synchronizing a plurality of local data sets stored thereon with the personal data sets and the server data sets.

24. The method as recited in claim 16, wherein the personal data sets and the server data sets each has three fields of information stored therewith including a name field, an identification field, and an index field for facilitating synchronization.

25. The method as recited in claim 16, wherein the correlation is stored on the portable data storage modules.

26. The method as recited in claim 16, wherein the synchronization of the personal data sets of different portable data storage modules only occurs on personal data sets specifically marked to be shared by including the server identification codes of the personal data sets of other portable data storage modules.

27. The method as recited in claim 17, wherein the conflict is resolved by marking the particular personal data sets of the second portable data storage module and alerting a user of the conflict via a user interface.

28. The method as recited in claim 17, wherein the conflict is resolved by not synchronizing the particular personal data sets of the second portable data storage module with the server data sets.

29. The method as recited in claim 17, wherein the conflict is resolved by replicating the particular personal data sets.

30. The method as recited in claim 17, wherein the conflict is resolved by synchronizing the particular personal data sets of the second portable data storage module with the server data sets.

31. A computer program embodied on a computer readable medium for providing a communication link between a server and a portable data storage module comprising:

a code segment for synchronizing a plurality of personal data sets on a portable data storage module with a plurality of server data sets on a server wherein the synchronization of the personal data sets between different portable data storage modules only occurs on personal data sets that are to be shared;

a code segment for sharing the personal data sets on the portable data storage module with another portable data storage module via the server, said personal data sets of each of the portable data storage modules having personal identification codes assigned thereto and the server data sets of the server having server identification codes assigned thereto; and a code segment for accessing a correlation between the personal identification codes and the server identification codes that is stored on at least one of the portable data storage module and the server.

32. The computer program as recited in claim 31, wherein a conflict occurs when particular personal data sets of a first one of the portable data storage modules is synchronized with the server data sets before the particular personal data sets of a second one of the portable data storage modules is synchronized with the server data sets, and the particular personal data sets of the first and second portable data storage modules are marked to be shared.

33. The computer program as recited in claim 32, wherein the conflict is resolved by marking the particular personal data sets of the second portable data storage module and alerting a user of the conflict via a user interface.

34. The computer program as recited in claim 31, wherein the personal data sets include task-oriented information.

35. The computer program as recited in claim 34, wherein the personal data sets include at least one contact and calendar information.

36. The computer program as recited in claim 31, wherein the communication link is resident in a client computer and is connected to the server via a network.

37. The computer program as recited in claim 36, wherein the network is at least one of the Internet and an intranet.

38. The computer program as recited in claim 31, wherein the communication link includes a link controller suitable for interfacing the portable data storage modules, and a client messenger in communication with the link controller and suitable for interfacing the server.

39. The computer program as recited in claim 38, wherein the client messenger is further suitable for interfacing local memory for synchronizing a plurality of local data sets stored thereon with the personal data sets and the server data sets.

40. The computer program as recited in claim 31, wherein the personal data sets and the server data sets each has three fields of information stored therewith including a name field, an identification field, and an index field for facilitating synchronization.

41. The computer program as recited in claim 31, wherein the correlation is stored on the portable data storage modules.

42. The computer program as recited in claim 31, wherein the synchronization of the personal data sets of different portable data storage modules only occurs on personal data sets specifically marked to be shared by including the server identification codes of the personal data sets of other portable data storage modules.

43. The computer program as recited in claim 32, wherein the conflict is resolved by not synchronizing the particular personal data sets of the second portable data storage module with the server data sets.

44. The computer program as recited in claim 32, wherein the conflict is resolved by synchronizing the particular personal data sets of the second portable data storage module with the server data sets.

45. The computer program as recited in claim 32, wherein the conflict is resolved by replicating the particular personal data sets.

* * * * *

UNITED STATES PATENT AND TRADEMARK OFFICE
CERTIFICATE OF CORRECTION

PATENT NO.    : 6,308,201 B1
DATED         : October 23, 2001
INVENTOR(S)   : Alvin Pivowar et al.

Page 1 of 1

It is certified that error appears in the above-identified patent and that said Letters Patent is hereby corrected as shown below:

Title page,
Column 2, OTHER PUBLICATIONS, line 8, reads:
"TrueSync Technology, TrueSync Tehcnology Platform,"; it should read: -- TrueSync Technology, TrueSync Technology Platform, --;

Column 1,
Line 40, reads: "screen of the PDA. Examples of PDA's are the Pahm™" it should read: -- screen of the PDA. Examples of PDA's are the Palm™ --;

Column 6,
Line 51, reads: "of a conduit SDK which is provided by 3Ccom™ for" it should read: -- of a conduit SDK which is provided by 3Com™ for --;

Column 7,
Line 52, reads: "the records which are 115 also retrieved and added to the" it should read: -- the records which are also retrieved and added to the --;

Column 13, claim 2,
Line 5, reads: "data sets include task oriented information." it should read: -- data sets include task-oriented information. --;

Column 14, claim 16,
Line 2, reads: "different portable data storage modules only occurs on" it should read: -- different portable data storage modules only occurs on --;

Signed and Sealed this

Twelfth Day of March, 2002

*Attest:*

*Attesting Officer*

JAMES E. ROGAN
*Director of the United States Patent and Trademark Office*